United States Patent [19]

Amano et al.

[11] Patent Number: 5,763,094
[45] Date of Patent: Jun. 9, 1998

[54] SHEET MATERIAL AND PROCESS FOR PRODUCTION THEREOF

[75] Inventors: Satoshi Amano; Takahiko Ito, both of Tokyo, Japan

[73] Assignee: Nisshinbo Industries, Inc., Tokyo, Japan

[21] Appl. No.: 428,554

[22] Filed: Apr. 25, 1995

[30] Foreign Application Priority Data

Apr. 27, 1994 [JP] Japan ................. 6-113702

[51] Int. Cl.$^6$ .............. B32B 5/02; B32B 5/06; B32B 27/00; B32B 27/06

[52] U.S. Cl. .......... 428/473.5; 264/241; 264/257; 264/258; 428/236; 428/240; 428/241; 428/245; 428/283; 428/290; 428/457; 428/458

[58] Field of Search .................. 428/236, 240, 428/241, 245, 283, 290, 457, 458, 473.5; 264/241, 257, 258

[56] References Cited

U.S. PATENT DOCUMENTS 5,180,631  1/1993  Amano ..................... 428/236

OTHER PUBLICATIONS

Webster's Ninth New Collegiate Dictionary, 1990, p. 954, definition 2 of "pulp".

*Primary Examiner*—Patrick D. Niland
*Attorney, Agent, or Firm*—Kubovcik & Kubovcik

[57] ABSTRACT

A sheet material including at least: an inorganic filler other than asbestos, a rubber material, a polycarbodiimide resin powder, and, as necessary, an organic or inorganic fiber; or a sheet material including (1) a sheet having the same constitution as the above sheet material and (2) a reinforcing material treated with a polycarbodiimide resin, and a process for producing the sheet material. The sheet material containing no asbestos is free from the problems of the asbestos-containing sheet materials of the prior art, has excellent flexibility, sealing property and heat resistance, and can be used as a gasket, a packing, etc. which are superior in chemical resistance, particularly flon substitute resistance.

17 Claims, No Drawings

SHEET MATERIAL AND PROCESS FOR PRODUCTION THEREOF

BACKGROUND OF THE INVENTION

(1) Field of the Invention

The present invention relates to a sheet material as well as to a process for production thereof. More particularly, the present invention relates to a sheet material which exhibits excellent flexibility, sealing property and heat resistance without using an asbestos fiber and which can be used as a gasket, a packing, etc. which have excellent chemical resistance, particularly excellent flon substitute resistance; as well as to a process for production of said sheet material.

(2) Description of the Prior Art

An asbestos sheet is known as a sheet material used in gaskets, packings, etc. This asbestos sheet as a conventional sheet material is generally made of asbestos as a base material fiber, a rubber as a binder and a filler in order to have flexibility, sealing property, heat resistance and strength. With respect to asbestos which is a natural product, however, there have arisen in recent years problems such as exhaustion of asbestos resource, resultant difficulty in asbestos procurement, and adverse effect on human health; accordingly, the use of asbestos is under restudy.

Because of the above-mentioned problems of asbestos, active researches have been conducted in the sheet material field in order to develop an asbestos sheet substitute by the use of a fibrous base material other than asbestos. As asbestos substitutes, there have been proposed inorganic fibers such as glass fiber, rock wool, ceramic fiber, carbon fiber and the like, as well as organic fibers such as aramid fiber, polyester fiber, polyacrylonitrile fiber, phenolic resin fiber and the like.

However, none of these inorganic and organic fibers has yet shown fully satisfactory sealing property because their diameters are large as compared with those of asbestos and are disadvantageous to produce a sheet material of dense structure.

In order to overcome the drawback, it was proposed to use a thermoplastic polyolefin fiber or the like and melt-bond the fiber to obtain improved sealing property. However, such a fiber generally causes remelting at a temperature of 180° C. or less and accordingly has insufficient heat resistance.

It has recently been studied to use refrigerant(s) other than flon because flon causes the destruction of ozone layer. Hence, it is desired to develop a sheet material having sufficient resistance to such flon substitute(s).

SUMMARY OF THE INVENTION

The objects of the present invention are to provide a sheet material which is free from the problems of the prior art, which exhibits excellent flexibility, sealing property and heat resistance without using an asbestos fiber and which can be used as a gasket, a packing, etc. which have excellent chemical resistance, particularly excellent flon substitute resistance; as well as a process for production of said sheet material.

The present invention provides a sheet material comprising at least:

an inorganic filler other than asbestos,
a rubber material,
a polycarbodiimide resin powder having a recurring unit represented substantially by a formula

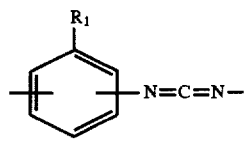

(wherein $R_1$ is a hydrogen atom, a lower alkyl group or a lower alkoxy group), or a formula

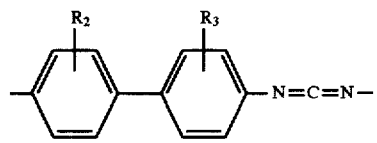

(wherein $R_2$ and $R_3$ are independently a hydrogen atom, a lower alkyl group or a lower alkoxy group), or a formula

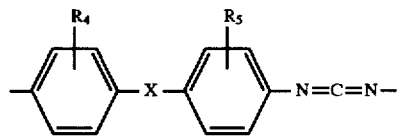

wherein $R_4$ and $R_5$ are independently a hydrogen atom, a lower alkyl group or a lower alkoxy group, and X is an oxygen atom or a methylene group) and, as necessary, an organic or inorganic fiber; or a sheet material comprising (1) a sheet having the same constitution as the above sheet material and (2) a reinforcing material treated with a polycarbodiimide resin.

The present invention also provides a process for producing a sheet material, which comprises mixing at least:

an inorganic filler other than asbestos,
a rubber material,
a polycarbodiimide resin powder having a recurring unit represented substantially by the above formula and, as necessary,
an organic or inorganic fiber to form a sheet, as necessary laminating the sheet with a reinforcing material treated with a polycarbodiimide resin, and then shaping the sheet or the laminate at a temperature which is not lower than the softening point of said polycarbodiimide resin powder.

DETAILED DESCRIPTION OF THE INVENTION

The present invention is hereinafter described in detail.

As mentioned previously, the first aspect of the sheet material of the present invention comprises at least:

an inorganic filler other than asbestos,
a rubber material,
a polycarbodiimide resin powder having a recurring unit represented substantially by the above formula and, as necessary,
an organic or inorganic fiber.

The inorganic filler has no particular restriction as long as it is an inorganic filler other than asbestos. Specific examples thereof are fibers such as glass fiber and the like; powders, flakes or whiskers of clay, talc, barium sulfate, mica, vermiculite, calcium carbonate, silica, wollastonite, magnesium sulfate, potassium titanate, carbon black and the like; and their appropriate mixtures.

As the rubber material, there can be used those known for use in joint sheets or informable sheets. Examples thereof are nitrile rubber (NBR), styrene-butadiene rubber (SBR), isoprene rubber (IR), chloroprene rubber (CR), butadiene rubber (BR), butyl rubber (IIR), ethylene-propylene rubber (EPM), ethylene-vinyl acetate rubber (EVA), chlorinated polyethylene rubber (CPE), epichlorohydrin rubber (ECO), nitrile-isoprene rubber (NIR), fluororubber (FRM), silicone rubber (Si), natural rubber (NR), and latexes thereof.

The polycarbodiimide resin used in the present invention is known per se, or can be produced by the known processes [reference is made to, for example, U.S. Pat. No. 2,941,956; Japanese Patent Publication No. 33279/1972; J. Org. Chem., 28, 2069-2075 (1963); and Chemical Review 1981, Vol. 81, No.4, 619-621]. It can easily be produced, for example, by subjecting an organic diisocyanate to a condensation reaction (wherein carbon dioxide is removed) in the presence of a carbodiimidization catalyst.

The organic diisocyanate used in the production of the polycarbodiimide resin can be any of aliphatic type, alicyclic type, aromatic type, aromatic-aliphatic type, etc. They can be used singly or in admixture of two or more (in the latter case, a copolymer is produced).

The polycarbodiimide resin used in the present invention includes homopolymers and copolymers containing at least one recurring unit represented by the following formula

wherein R represents an organic diisocyanate residue.

The above R (organic diisocyanate residue) is preferably an aromatic diisocyanate residue. Herein, "organic diisocyanate residue" refers to an organic diisocyanate moiety which remains when two isocyanate groups (NCO) are removed from one organic diisocyanate molecule. Examples of such an organic diisocyanate are those represented by formula (1)

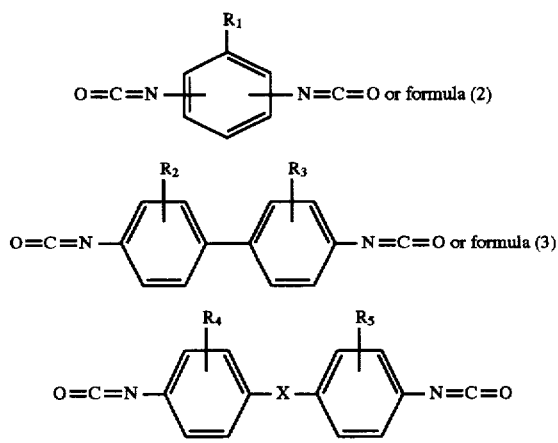

In the above formulas, $R_1$, $R_2$ and $R_3$ each represent a hydrogen atom, a lower alkyl group such as methyl, ethyl, propyl, butyl or the like, or a lower alkoxy group corresponding to said alkyl group; $R_4$ and $R_5$ each represent a hydrogen atom, a lower alkyl group or a lower alkoxy group (the alkyl group and alkoxy group are the same as those mentioned with respect to $R_1$ to $R_3$); and X represents an oxygen atom or a methylene group.

Specific examples of the organic diisocyanate represented by formula (1) include 2,4-tolylene diisocyanate, 2,6-tolylene diisocyanate, a mixture thereof and 1-methoxyphenyl-2,4-diisocyanate. Specific examples of the organic diisocyanate represented by formula (2) include o-tolidine diisocyanate. Specific examples of the organic diisocyanate represented by formula (3) include 4,4'-diphenylmethane diisocyanate, 4,4'-diphenyl ether diisocyanate and 3,3'-dimethyl-4,4'-diphenyl ether diisocyanate. These diisocyanates can be used singly or in admixture of two or more.

The reaction for converting the organic diisocyanate into a polycarbodiimide resin is conducted in the presence of a carbodiimidization catalyst. The carbodiimidization catalyst includes, for example, phospholene oxides such as 3-methyl-1-phenyl-2-phospholene-1-oxide and the like.

The polycarbodiimide resin of powdery form used in the present invention can be obtained, for example, by a process described in Japanese Patent Application Kokai (Laid-Open) No. 239223/1993, which comprises spray-drying a polycarbodiimide resin solution, or by a process described in, for example, D. J. Lyman, Die Makromol. Chem., 67, 1 (1963) and L. M. Alberino et al., J. Appl. Polym. Sci., 21, 1999 (1977), which comprises conducting a reaction in an ordinary solvent and collecting the resulting precipitate as a powder. The polycarbodiimide resin powder preferably has a thermal decomposition temperature of at least 500° C.

The polycarbodiimide resin powder used in the present invention, being powdery, can be uniformly dispersed in the sheet material and can be uniformly and densely filled in the inorganic filler and the fiber component. As a result, the sheet material has improved toughness and sealing property.

The present sheet material may comprise, in addition to the above-mentioned components, an appropriate fiber as necessary. The fiber includes an organic fiber and an inorganic fiber. Specific examples of the fiber are a polyamide fiber, an aramid fiber, a carbon fiber, a polyester fiber, a polyacrylonitrile fiber, pulps thereof, and celluloses (e.g. cotton, hemp, pulp).

The proportions of the individual components mentioned above can appropriately be determined depending upon the application purposes and conditions of the present sheet, but are as follows, for example.

| Inorganic filler other than asbestos | 30–90% by weight |
| Rubber material | 5–50% by weight |
| Polycarbodiimide resin powder | 1–50% by weight |
| Fiber | 0–50% by weight |

The second aspect of the sheet material of the present invention comprises (1) a sheet comprising at least:
  an inorganic filler other than asbestos,
  a rubber material,
  a polycarbodiimide resin powder having a recurring unit represented substantially by the above-mentioned formula and, as necessary,
  an organic or inorganic fiber (this sheet has the same constitution as the sheet material of the first aspect), and (2) a reinforcing material treated with a polycarbodiimide resin.

The polycarbodiimide resin used in the sheet material of the second aspect can be, for example, the same polycarbodiimide resin used in the sheet material of the first aspect as a powder. Incidentally, the general processes for production of polycarbodiimide resin are disclosed in literatures such as D. J. Lyman et al., Die Markromol. Chem., 67, 1 (1963); B. Dyer et al., J. Amer. Chem. Soc., 80, 5495 (1958); L. M. Alberino et al., J. Appl. Polym. Sci., 21, 1999 (1977); T. W. Campbell, J. Org. Chem., 28, 2069 (1963); Japanese Patent Application Kokai (Laid-Open) No. 61599/1976; and Japanese Patent Application Kokai (Laid-Open) No. 292316/1991.

The reinforcing material used in the sheet material of the second aspect includes, for example, woven cloths, unwoven cloths and papers all made of an inorganic or organic fiber other than asbestos; films made of a polyester, a polyamide, a polycarbonate, a polyimide or a polycarbodiimide; and metal sheets such as stainless steel sheet, iron sheet, copper sheet, aluminum sheet or the like. Incidentally, "a reinforcing material treated with a polycarbodiimide resin" includes a film made of a polycarbodiimide resin itself.

In any of the sheet materials of the first and second aspects, the fiber is used as a reinforcing material. When no strength is required for the sheet material, therefore, the fiber is unnecessary. The same applies to the reinforcing material treated with a polycarbodiimide resin.

The sheet material of the second aspect may be constituted by the sheet (1) and the reinforcing material (2), each used as plural layers. For example, the sheet material may comprise one layer of the sheet (1) and two layers of the reinforcing material (2) arranged on both sides of said sheet (1), or the sheet (1) may further be arranged on one side or both sides of said reinforcing material (2).

The sheet material of the present invention can be produced by mixing at least:

an inorganic filler other than asbestos, a rubber material, a polycarbodiimide resin powder having a recurring unit represented substantially by the above formula and, as necessary, an organic or inorganic fiber to form a sheet, as necessary laminating the sheet with a reinforcing material treated with a polycarbodiimide resin, and then shaping the sheet or the laminate at a temperature which is not lower than the softening point of said polycarbodiimide resin powder.

The shaping of the sheet or the laminate obtained by the method for producing a beater sheet or a joint sheet, can be conducted by a known means, and the temperature employed in the shaping can be, for example, 150° C. or more.

In the production of the sheet material of the present invention, it is possible to add an organic binder such as acrylic resin emulsion, phenolic resin emulsion, polyvinyl alcohol emulsion, rubber emulsion or the like in an amount not adversely affecting the properties of the resulting sheet material. Incidentally, some of the above-mentioned fillers, such as clay, talc, silica, wollastonite, mica and the like function also as a binder and can increase the strength of the resulting sheet material; therefore, there is no distinct difference between the filler and the binder in the present invention.

The present invention is hereinafter described in more detail.

EXAMPLE 1

(1) Production of polycarbodiimide resin powder 675 g of MDI (4,4'-diphenylmethane diisocyanate) and 71.4 g of phenyl isocyanate were reacted in 2,458 g of tetrachloroethylene in the presence of 1.5 g of a carbodiimidization catalyst (3-methyl-1-phenyl-2-phospholene-1-oxide) at 120° C. for 4 hours to obtain a transparent light-yellow polycarbodiimide resin solution (resin concentration =20%). This solution was cooled to 40° C. in 12 hours to obtain a polycarbodiimide resin slurry having a viscosity of 270 cp. This polycarbodiimide resin slurry was spray-dried at 60° C. at an air pressure of 2 kg/cm² at a slurry-feeding rate of 1 l/hr to obtain a light yellow powder.

(2) Production of sheet material

| Polycarbodiimide resin powder | 12% by weight |
|---|---|
| Inorganic filler | 65% by weight |
| Rubber material (NBR latex) | 23% by weight |
| | (as solid content) |

The above materials of the above proportions were mixed to prepare a sheet.

Separately, a glass cloth of 0.1 mm in thickness was dipped in a solution of 5% by weight of a polycarbodiimide resin in tetrahydrofuran, followed by drying, whereby was obtained a reinforcing material having a resin content of 20% by weight, consisting of a glass cloth whose surface and fiber-to-fiber gaps are coated or filled with a polycarbodiimide resin. This reinforcing material was interposed between the two sheets which were previously prepared, and the laminate was shaped at 180° C. under pressure to obtain a sheet of 0.5 mm in thickness. Incidentally, the solution of polycarbodiimide resin in tetrahydrofuran was produced by reacting 4,4'-diphenylmethane diisocyanate (MDI) in tetrahydrofuran in the presence of a carbodiimidization catalyst (hereinafter, any solution of polycarbodiimide resin in tetrahydrofuran was produced in the same manner).

The sheet was measured for tensile strength, sealing property and flon resistance. In the measurement of "sealing property", a gasket of desired shape was stamped from the sheet; the gasket was inserted between two flanges; the flanges were tightened at a 100 kg/cm² with a torque wrench; then, nitrogen of 7 kg/cm² was passed through inside and the portion of nitrogen leaking from the flanges was collected by water replacement method for 10 minutes; and the total leakage volume was taken as the sealing property of the sheet. In the measurement of "flon resistance", the sheet was dipped in R12 and R134a at 70° C. for 24 hours according to JIS R 3453 and the retention of tensile strength after dipping was taken as the flon resistance of the sheet.

EXAMPLE 2

| Polycarbodiimide resin powder (obtained in Example 1) | 15% by weight |
|---|---|
| Inorganic filler | 65% by weight |
| Rubber material (NBR latex) | 20% by weight |
| | (as solid content) |

The above materials of the above proportions were mixed to prepare a sheet.

Separately, a polyester film of 0.1 mm in thickness was sprayed, at the surface, with a solution of 3% by weight of a polycarbodiimide resin in tetrachloroethylene, followed by drying, whereby was obtained a reinforcing material treated with a polycarbodiimide resin. This reinforcing material was interposed between the two sheets which were previously prepared, and the laminate was shaped at 200° C. under pressure to obtain a sheet of 0.5 mm in thickness. The sheet was measured for tensile strength, sealing property and flon resistance. The above solution of polycarbodiimide resin in tetrachloroethylene was produced by reacting a 2,4-tolylene diisocyanate/2,6-tolylene diisocyanate (80:20) mixture [TDI] in tetrachloroethylene in the presence of a carbodiimidization catalyst (hereinafter, any solution of polycarbodiimide resin in tetrachloroethylene was produced in the same manner).

EXAMPLE 3

| Polycarbodiimide resin powder (obtained in Example 1) | 14% by weight |
|---|---|
| Inorganic filler | 65% by weight |
| Rubber material (NBR) | 21% by weight |

The above materials of the above proportions were mixed with an appropriate amount (about 80% by weight based on the total weight of the above materials) of toluene, and the mixture was kneaded with a kneader, followed by shaping using a calender roll, to form a sheet.

Separately, a carbon cloth of 0.15 mm in thickness was dipped in a solution of 5% by weight of a polycarbodiimide resin in tetrachloroethylene, followed by drying, whereby was obtained a reinforcing material treated with 5% by its weight of a polycarbodiimide resin. This reinforcing material was interposed between the two sheets which were previously prepared, and the laminate was shaped at 200° C. under pressure to obtain a sheet of 0.5 mm in thickness. The sheet was measured for tensile strength, sealing property and flon resistance.

EXAMPLE 4

| Polycarbodiimide resin powder (obtained in Example 1) | 17% by weight |
|---|---|
| Inorganic filler | 68% by weight |
| Rubber material (mixed latex of NBR and acrylic rubber) | 15% by weight (as solid content) |

The above materials of the above proportions were mixed to form a sheet.

Separately, a stainless steel sheet of 0.1 mm in thickness was sprayed with a solution of 3% by weight of a polycarbodiimide resin in tetrahydrofuran, followed by drying, to obtain a reinforcing material treated with a polycarbodiimide resin. This reinforcing material was interposed between the two sheets which were previously prepared, and the laminate was shaped at 200° C. under pressure to obtain a sheet of 0.6 mm in thickness. The sheet was measured for tensile strength, sealing property and flon resistance.

EXAMPLE 5

(1) Production of polycarbodiimide resin powder 600 g of MDI (4,4'-diphenylmethane diisocyanate) and 23.8 g of phenyl isocyanate were reacted in 3,840 g of tetrachloroethylene in the presence of 10 g of a carbodiimidization catalyst (3-methyl-1-phenyl-2-phospholene-1-oxide) at 120° C. for 4.5 hours. The reaction mixture was cooled to room temperature to give rise to precipitation. The precipitate was collected by filtration, dried and ground to obtain a polycarbodiimide resin powder.

(2) Production of sheet material

| Polycarbodiimide resin powder | 15% by weight |
|---|---|
| Inorganic filler | 52% by weight |
| Aramid pulp | 10% by weight |
| Rubber material (NBR latex) | 23% by weight (as solid content) |

The above materials of the above proportions were mixed to form a sheet. The sheet was shaped at 180° C. under pressure to obtain a sheet of 0.5 mm in thickness. The sheet was measured for tensile strength, sealing property and flon resistance.

EXAMPLE 6

| Polycarbodiimide resin powder (obtained in Example 5) | 20% by weight |
|---|---|
| Aramid pulp | 5% by weight |
| Cellulose pulp | 2% by weight |
| Inorganic filler | 58% by weight |
| Rubber material (NBR) | 15% by weight |

The above materials of the above proportions were mixed with an appropriate amount (about 80% by weight based on the total weight of the above materials) of toluene, and the mixture was kneaded with a kneader and then passed through a roll to form a sheet. The sheet was shaped at 180° C. under pressure to obtain a sheet of 0.7 mm in thickness. The sheet was measured for tensile strength, sealing property and flon resistance.

EXAMPLE 7

(1) Production of polycarbodiimide resin powder 100 g of 80-TDI [a 2,4-tolylene diisocyanate/2,6-tolylene diisocyanate (80:20) mixture], 575 g of MDI (4,4'-diphenylmethane diisocyanate) and 35.7 g of phenyl isocyanate were reacted in 2,700 g of tetrachloroethylene in the presence of 1.4 g of a carbodiimidization catalyst (3-methyl-1-phenyl-2-phospholene-1-oxide) at 120° C. for 4 hours to obtain a transparent light-yellow polycarbodiimide resin solution. The solution was cooled to room temperature to give rise to precipitation. The precipitate was collected by filtration, dried and ground to obtain a polycarbodiimide resin powder.

(2) Production of sheet material

| Polycarbodiimide resin powder | 20% by weight |
|---|---|
| Aramid pulp | 3% by weight |
| Carbon fiber | 2% by weight |
| Inorganic filler | 60% by weight |
| Rubber material (chloroprene rubber latex) | 15% by weight (as solid content) |

The above materials of the above proportions were mixed to form a sheet.

Separately, a stainless steel sheet of 0.1 mm in thickness was sprayed with a solution of 3% by weight of a polycarbodiimide resin in tetrachloroethylene, followed by drying, to obtain a reinforcing material treated with a polycarbodiimide resin. This reinforcing material was interposed between the two sheets which were previously prepared, and the laminate was shaped at 200° C. under pressure to obtain a sheet of 0.6 mm in thickness. The sheet was measured for tensile strength, sealing property and flon resistance.

COMPARATIVE EXAMPLE 1

A commercial non-asbestos joint sheet was measured for tensile strength, sealing property and flon resistance.

The results of the above measurement in Examples 1–7 and Comparative Example 1 are shown in Table 1.

TABLE 1

| | Tensile strength (kg/cm$^2$) | Sealing property (cc/10 min) | Flon resistance (retention of strength) |
|---|---|---|---|
| Example 1 | 8.5 (fiber direction) 3.5 (45° direction) | 90 | 109 |

TABLE 1-continued

| | Tensile strength (kg/cm²) | Sealing property (cc/10 min) | Flon resistance (retention of strength) |
|---|---|---|---|
| Example 2 | 4.5 | 50 | 106 |
| Example 3 | 8.7 (fiber direction) | 100 | 108 |
| | 4.1 (45° C. direction) | | |
| Example 4 | 10 or more | 50 | 100 |
| Example 5 | 2 | 50 | 96 |
| Example 6 | 2 | 55 | 95 |
| Example 7 | 10 or more | 49 | 100 |
| Comparative Example 1 | 1.8 | 700 | 70 |

The sheet material of the present invention, which uses no asbestos fiber contained in conventional products, gives no adverse effect on human health. Further, it has excellent flexibility, sealing property and heat resistance and therefore is superior as a sheet material for use in, for example, gaskets and packings.

Furthermore, the present sheet material has excellent chemical resistance, particularly excellent durability to flon substitute.

What is claimed is:

1. A sheet material comprising at least:
   an inorganic filler other than asbestos,
   a rubber material,
   a polycarbodiimide resin powder having a recurring unit represented by a formula

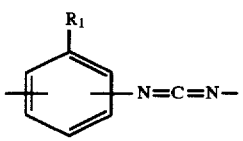

(wherein $R_1$ is a hydrogen atom, a lower alkyl group or a lower alkoxy group), or a formula

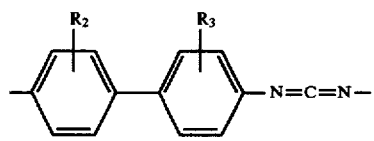

(wherein $R_2$ and $R_3$ are independently a hydrogen atom, a lower alkyl group or a lower alkoxy group), or a formula

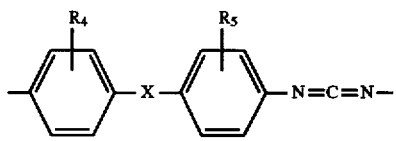

(wherein $R_4$ and $R_5$ are independently a hydrogen atom, a lower alkyl group or a lower alkoxy group, and X is an oxygen atom or a methylene group) and, optionally, an organic or inorganic fiber.

2. A sheet material comprising:
   (1) a sheet comprising at least:
   an inorganic filler other than asbestos,
   a rubber material,
   a polycarbodiimide resin powder having a recurring unit represented by a formula

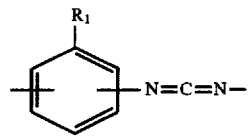

(wherein $R_1$ is a hydrogen atom, a lower alkyl group or a lower alkoxy group), or a formula

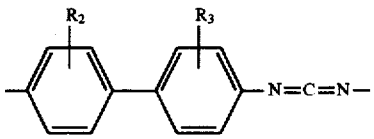

(wherein $R_2$ and $R_3$ are independently a hydrogen atom, a lower alkyl group or a lower alkoxy group), or a formula

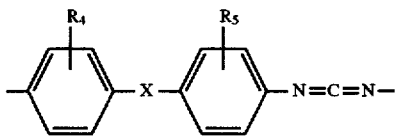

(wherein $R_4$ and $R_5$ are independently a hydrogen atom, a lower alkyl group or a lower alkoxy group, and X is an oxygen atom or a methylene group) and, optionally, an organizer inorganic fiber, and
   (2) a reinforcing material treated with a polycarbodiimide resin.

3. A sheet material according to claim 1 or 2, wherein the polycarbodiimide resin powder has a thermal decomposition temperature of 500° C. or more.

4. A sheet material according to claim 1 or 2, wherein the polycarbodiimide resin powder consists of at least two different polycarbodiimide resin powders.

5. A sheet material according to claim 1 or 2, wherein the fiber optional is a polyamide fiber, an aramid fiber, a carbon fiber, a polyester fiber, a polyacrylonitrile fiber or a cellulose fiber of cotton, hemp or pulp.

6. A sheet material according to claim 2, wherein the reinforcing material is a woven cloth, an unwoven cloth or a paper each made of an inorganic fiber other than asbestos or an organic fiber.

7. A sheet material according to claim 2, wherein the reinforcing material is a polyester film, a polyamide film, a polycarbonate film, a polyimide film or a polycarbodiimide film.

8. A sheet material according to claim 2, wherein the reinforcing material is a stainless steel sheet, an iron sheet, a copper sheet or an aluminum sheet.

9. A sheet material according to claim 1, comprising the inorganic filler other than asbestos, the rubber material, the polycarbodiimide resin powder and the fiber in amounts of 30–90% by weight, 5–50% by weight, 1–50% by weight and 0–50% by weight, respectively.

10. A sheet material according to claim 2, wherein the sheet (1) comprises the inorganic filler other than asbestos, the rubber material, the polycarbodiimide resin powder and the fiber in amounts of 30–90% by weight, 5–50% by weight, 1–50% by weight and 0–50% by weight, respectively.

11. A sheet material according to claim 2, comprising the sheet (1) and the reinforcing material (2) each in a plurality of layers.

12. A process for producing a sheet material, which comprises mixing at least:

an inorganic filler other than asbestos, a rubber material, a polycarbodiimide resin powder having a recurring unit represented by a formula

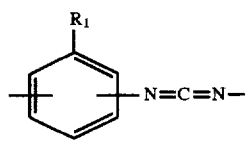

(wherein $R_1$ is a hydrogen atom, a lower alkyl group or a lower alkoxy group), or a formula

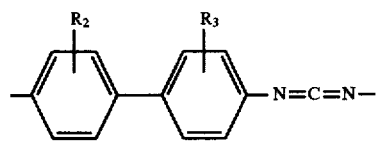

wherein $R_2$ and $R_3$ are independently a hydrogen atom, a lower alkyl group or a lower alkoxy group), or a formula

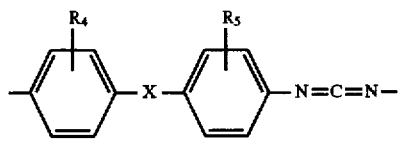

(wherein $R_4$ and $R_5$ are independently a hydrogen atom, a lower alkyl group or a lower alkoxy group, and X is an oxygen atom or a methylene group) and, optionally, an organic or inorganic fiber to form a sheet and then shaping the sheet at a temperature which is not lower than the softening point of the polycarbodiimide resin powder.

13. A process for producing a sheet material, which comprises mixing at least:

an inorganic filler other than asbestos, a rubber material, a polycarbodiimide resin powder having a recurring unit represented by a formula

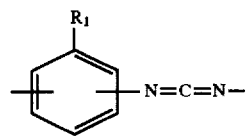

(wherein $R_1$ is a hydrogen atom, a lower alkyl group or a lower alkoxy group), or a formula

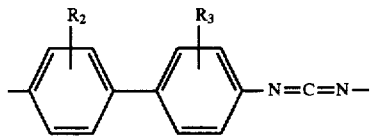

(wherein $R_2$ and $R_3$ are independently a hydrogen atom, a lower alkyl group or a lower alkoxy group), or a formula

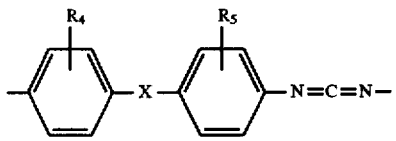

(wherein $R_4$ and $R_5$ are independently a hydrogen atom, a lower alkyl group or a lower alkoxy group, and X is an oxygen atom or a methylene group) and, optionally, an organic or inorganic fiber to form a sheet, laminating the sheet with a reinforcing material treated with a polycarbodiimide resin, and then shaping the laminate at a temperature which is not lower than the softening point of said polycarbodiimide resin powder.

14. A process according to claim 12 or 13, wherein the polycarbodiimide resin powder consists of at least two different polycarbodiimide resin powders.

15. A process according to claim 12 or 13, wherein the shaping is conducted at a temperature of not lower than 150° C.

16. A process according to claim 12, wherein the inorganic filler other than asbestos, the rubber material, the polycarbodiimide resin powder and the fiber are mixed in amounts of 30–90% by weight, 5–50% by weight, 1–50% by weight and 0–50% by weight, respectively.

17. A process according to claim 13, wherein the inorganic filler other than asbestos, the rubber material, the polycarbodiimide resin powder and the fiber are mixed in amounts of 30–90% by weight, 5–50% by weight, 1–50% by weight and 0–50% by weight, respectively.

* * * * *